April 2, 1935.  J. R. ALLAN ET AL  1,996,226
WHEEL
Filed July 13, 1933  2 Sheets-Sheet 1
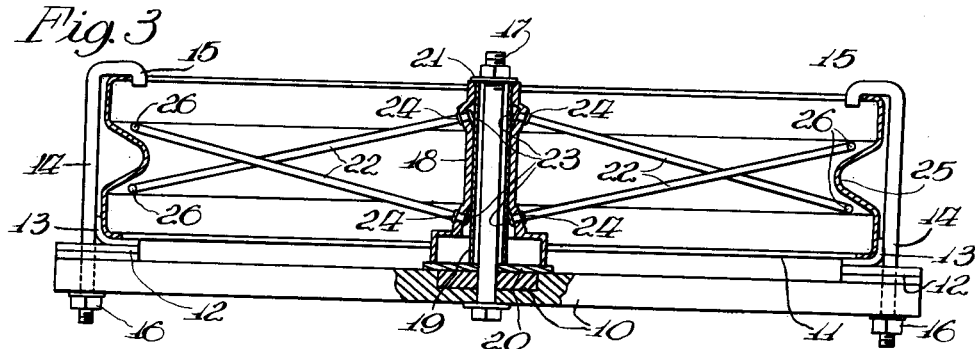
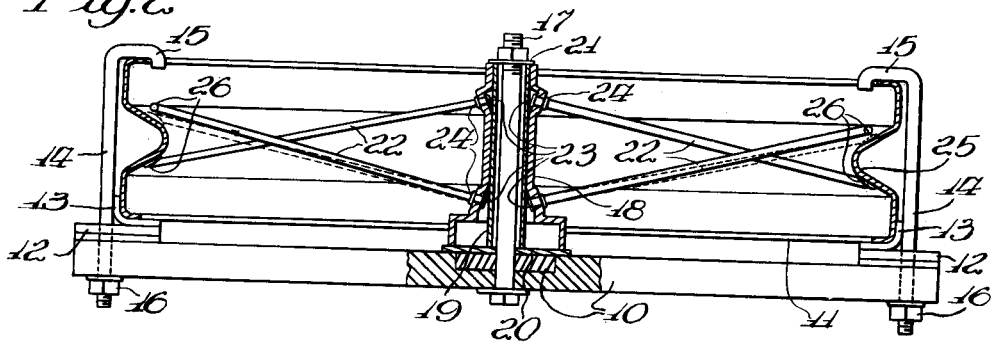
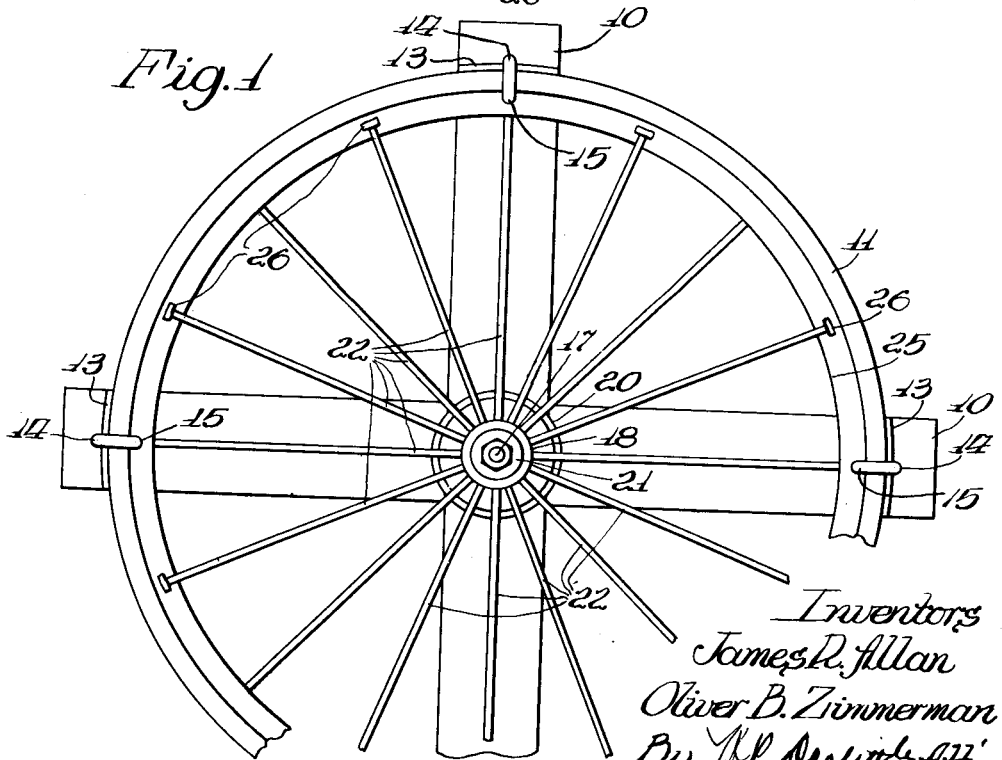
Inventors
James R. Allan
Oliver B. Zimmerman
By W. P. Doolittle Atty.

April 2, 1935.  J. R. ALLAN ET AL  1,996,226
WHEEL
Filed July 13, 1933   2 Sheets-Sheet 2
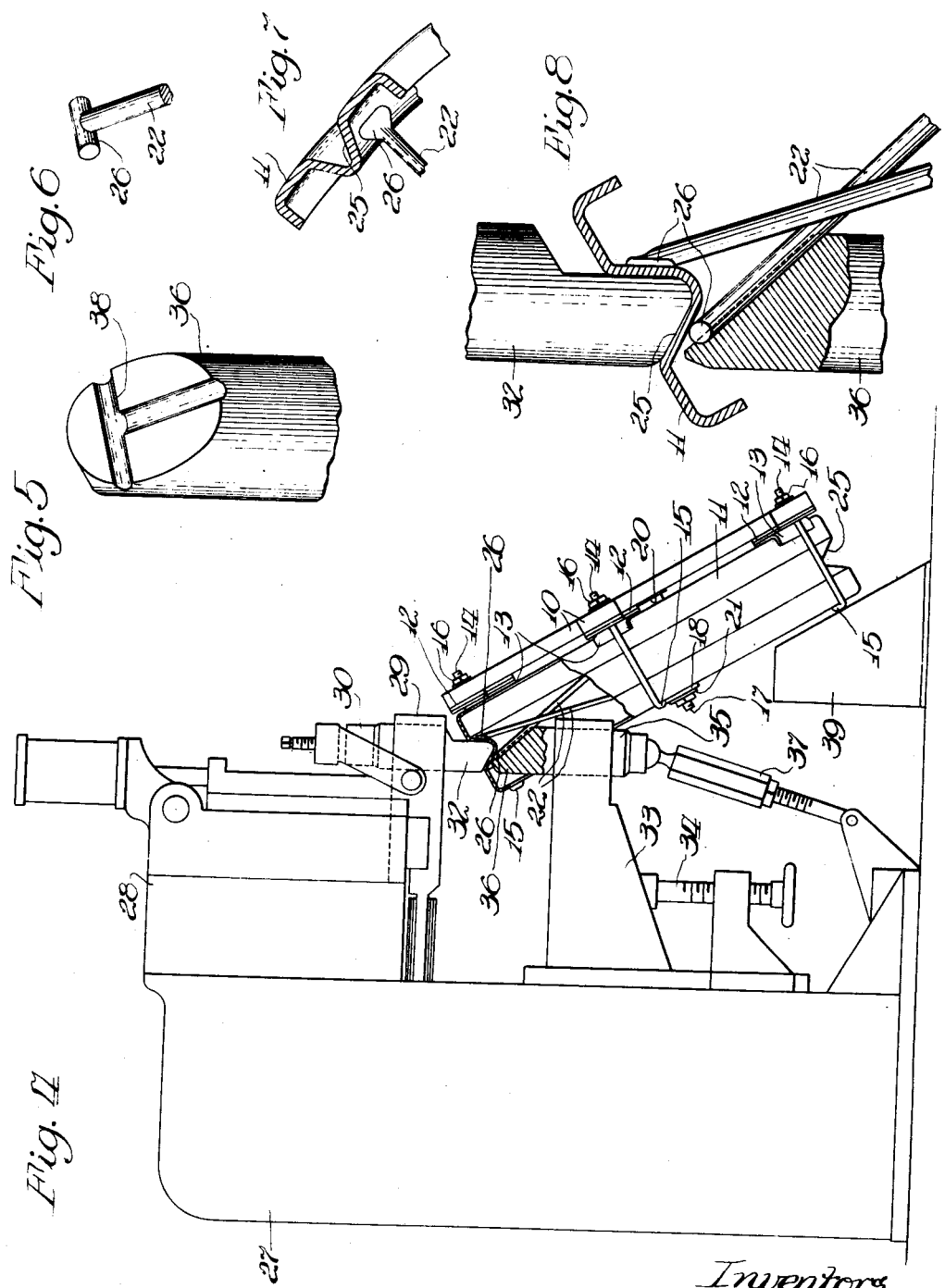
Inventors
James R. Allan
Oliver B. Zimmerman
By W. F. Doolittle Atty.

Patented Apr. 2, 1935

1,996,226

UNITED STATES PATENT OFFICE 1,996,226

WHEEL

James R. Allan, Oak Park, and Oliver B. Zimmerman, La Grange, Ill., assignors to International Harvester Company, a corporation of New Jersey Application July 13, 1933, Serial No. 680,202

5 Claims. (Cl. 219—10)

This invention relates to a wheel and to a method for making the wheel.

The principal object of the invention is to construct an improved tension wheel.

Another principal object is to utilize resistance welding in such a manner as to obtain the desired tension in the spokes of a wheel.

Another object is to utilize a rim section for a wheel having a maximum strength for the amount of material used and to utilize said rim in combination with an improved means for securing the spokes to the rim.

These objects and others which will be apparent are attained by first forming a hub and spoke unit, commonly termed a spider, and subsequently securing the spokes to a rim having a particular cross section adapting it to the securing method of the invention.

In the drawings:

Figure 1 is a plan view of the clamp and wheel units illustrating the method of assembly;

Figure 2 is a view similar to Figure 1, showing one set of the spokes welded in position, the dotted lines showing the final position of the second set of spokes;

Figure 3 is a sectional view, showing a spoke and hub assembly and a rim clamped into position, ready for the first step of the assembling method;

Figure 4 is an elevation of a welding machine adaptable for performing the securing operation utilized in the method of the invention;

Figure 5 is an enlarged detailed view of the end of the lower electrode;

Figure 6 is an enlarged detailed view of one of the T-headed spoke ends prior to welding;

Figure 7 is a section through the rim, showing in perspective a portion of the rim and a spoke secured thereto; and, Figure 8 is an enlarged view, partly in section, showing the two electrodes in position prior to the welding operation.

The clamping means, as illustrated in Figures 1, 2 and 3, is provided with a base 10 formed of two members crossed at their centers. Said members are of sufficient rigidity to provide a support for obtaining the desired tension, as will be hereinafter described.

A wheel rim 11, to which spokes are to be attached, is mounted on the supporting base, spaced therefrom by elements 12, which may be of variable thickness to provide for proper spacing. Spacing elements 13 are also provided, said elements being curved to fit the edge of the rim and to extend along the peripheral face or tread portion of the rim. Hook bolts 14, having an upper portion 15 shaped to fit over the edge of the rim, extend through openings in the ends of the cross-members forming the supporting base 10, and are provided with nuts 16 threaded thereon below the cross-members, thereby providing means for securely clamping the rim against the spacing elements and in position on the supporting base. The bolts 14 are so located as to position the rim accurately in combination with the spacing elements 13, portions of which contact with the rim and with the bolts 14.

A bolt 17 extends centrally through the supporting base to form a support for a flanged hub 18, which is mounted concentrically with respect to the bolt and the rim 11. A sleeve 19 is mounted between the hub and the bolt 17. A spacing member 20 of suitable thickness is provided on which the flanged portion of the hub seats. A washer 21 is fitted on the bolt 17 and adapted to seat on the end of the hub 18.

As shown in Figure 1, a hub, carrying a plurality of crossed spokes 22 secured thereto, is secured on the clamping bolt 17. Said spokes, as shown, are secured to the hub by inside heads 23 and outside shoulders 24. The series of spokes secured to the hub adjacent the flange end cross the spokes secured to the hub at the other end, the length of the hub giving a substantial angle to the spokes with respect to the axis of the hub.

At their outer ends, the spokes lie adjacent the sides of a V-shaped groove 25 formed in the rim. As shown in Figure 6, the spokes 22 are preformed prior to their being secured to the hub with a T-head 26. Said head may be of any shape adapted for resistance welding. The form illustrated has been found to be satisfactory and may be formed by a single operation of an upsetting machine upon a heated spoke end.

The wheel parts assembled in position, as shown in Figure 3, are ready for the welding operation. A machine 27 has been illustrated, which is of a conventional construction. An outwardly extending upper portion 28 carries a supporting arm 29, in which an electrode carrier 30 is mounted. Means, not shown in detail, are provided for reciprocating the electrode holder 30 and the electrode 32 carried thereby. An outwardly extending member 33, positioned below the upper portion 28, is adjustably supported by a hand screw 34 whereby the vertical position of said member may be altered. An electrode holder 35 supports an electrode 36 in alignment with the electrode 32. An additional bracing member 37 is provided directly under the electrode holder 35 for additional support when heavy pressures are utilized.

The electrode 32, as shown in the enlarged view of Figure 8, is shaped to fit in the V-shaped groove 25 of the rim 11. It will be noted that said electrode fits both wall portions of the groove, whereby relative movement of the rim with respect to the electrode is not permitted, even though the wall on which the welding operation is performed is at a substantial angle with respect to the direction in which pressure is applied by the electrode. The electrode 36, as shown in Figure 5, is provided with a slot 38 which is adapted to closely embrace the T-end 26 of the spokes.

The wheel for the first series of operations, clamped on the base 10, is put into the position shown in Figure 4, a support 39 being provided with an angle face which gives the proper angular position for the wheel with respect to the electrodes 32 and 36. With the electrode 32 in position in the V-shaped groove of the rim, the electrode 36 engages the end of the spoke with the T-end, the adjacent portion of the spoke fitting in the grooves 38 formed in said electrode, and the application of pressure bringing the T spoke end against the inclined side wall of the rim groove. Following conventional practice, current is applied until the parts reach the proper temperature, following which additional movement of the electrode pushes the T-head into its final position, as shown in Figure 4. It will be noted that the angle of the lower electrode 36 with respect to the spoke being operated upon is such that there is a component force in a direction longitudinal of the spoke in an outward direction. This force applies tension to the spoke and slides the contacting end thereof along the wall of the V-groove. By this means, tension may be imparted to the spoke.

After one series of spokes, that is, a series secured at one end of the hub, is secured in position by successive operations upon the spoke ends, as described, the wheel assembly is turned over on the supporting base into the position shown in Figure 2, with the secured spokes extending from the upper end of the hub to the lower side of the V-shaped groove. By proper spacing of the elements 12 and 20, the wheel assembly can be clamped by the hook bolts 14 with any desired amount of tension on the series of spokes already secured in position. The other series of spokes is then secured to the other side of the V-shaped groove in exactly the same manner.

By a method as above described, a wheel can be assembled by welding with the desired amount of tension in the spokes. It is to be understood that the spider assembly, including the hub and the two sets of spokes, may be built up in any manner; for example, by welding, hot or cold riveting, or by casting the spokes in the hub. In any of these methods, it is necessary only to gauge the spoke ends a substantially uniform distance from the axis of the hub. Due to the securing of the spoke ends along the side of the V-shaped groove in the tire rim, it is not absolutely necessary to have all of the spokes of exactly the same length, appreciable variation being permitted in the point at which the spoke end engages with the walls of the V-shaped groove.

The nature of the machine, as illustrated, and the method followed make it clear that a predetermined tension may be secured in the spokes by utilizing different pressure angles on the spokes and different pressures on the electrode holding means. By following this method, a wheel may be built with the spokes of substantially uniform tension and with the tension factor as desired. This is a particularly important step of the method and a marked advance in the art, as, in welded wheels as heretofore constructed, great difficulty has been encountered in obtaining uniform tension in the spokes.

It is to be understood that, although applicants have shown certain rim and certain spoke end shapes, and certain apparatus for carrying out the method of the invention, they contemplate all methods set forth in the following claims and means for carrying out such methods.

What is claimed is:

1. A method of making metal wheels which comprises forming a spider portion including a hub and radially projecting spokes, forming a rim with an inwardly projecting V-groove, and securing the outer ends of the spokes to the walls of the V by welding pressure applied at an angle away from perpendicular to the walls of the V-groove during the securing operation whereby tension is imparted to the spokes.

2. A method of making wheels which comprises forming a spider portion having a hub and spokes extending outwardly therefrom, the alternate spokes extending from opposite ends of the hub and crossing intermediate their ends, forming a rim with an inwardly projecting V-groove, clamping the spider portion and the rim in fixed position with respect to each other with the free ends of the spokes lying alternately on opposite sides of the V-groove, securing all of the spokes at one side of the V-groove by welding, said welding being effected by electrodes under pressure acting at an angle with respect to perpendicular to the wall of the V-groove whereby tension is imparted to the spokes, clamping the wheel with the spokes secured at one side of the V in position with the spokes under a predetermined tension, and securing the spokes at the other side of the groove into position by welding, said welding being effected by electrodes operated upon by a pressure at an angle with respect to perpendicular to that wall of the V-groove.

3. A method of making wheels which comprises forming a spider portion including a hub and radially projecting spokes, forming a rim with a grooved portion having an angled side wall, and securing the outer ends of the spokes to said wall by welding pressure applied at an angle away from perpendicular to the angled side wall during the securing operation whereby the tension of the spokes is regulated.

4. A method of making wheels which comprises forming a spider portion including a hub and radially projecting spokes, forming a rim with an inwardly projecting groove having an angled side wall, and securing the outer ends of the spokes to said wall by welding pressure applied at an angle away from perpendicular to the angled side wall during the securing operation whereby tension of the spokes may be regulated by movement of the spoke end along the angled side wall.

5. A method of making metal wheels which comprises forming a hub member and a rim member, forming one of said members with a flange projecting toward the other member at an angle with respect to the plane of the wheel, securing spokes to the other member with their free ends terminating adjacent the flange, securing the hub member against movement relative to the rim, and securing the spokes to the flange by welding with application of pressure applied at an angle away from perpendicular to the flange whereby the tension of the spokes may be regulated by movement of the spoke ends radially of the flange.

JAMES R. ALLAN.
OLIVER B. ZIMMERMAN.